United States Patent
Okanohara et al.

(10) Patent No.: US 12,106,232 B2
(45) Date of Patent: Oct. 1, 2024

(54) CROSS-DOMAIN TIME SERIES DATA CONVERSION APPARATUS, METHODS, AND SYSTEMS

(71) Applicant: Preferred Elements, Inc., Tokyo-to (JP)

(72) Inventors: Daisuke Okanohara, Tokyo (JP); Justin B. Clayton, Menlo Park, CA (US)

(73) Assignee: Preferred Networks, Inc., Tokyo (JP)

( * ) Notice: Subject to any disclaimer, the term of this patent is extended or adjusted under 35 U.S.C. 154(b) by 1051 days.

(21) Appl. No.: 16/579,552

(22) Filed: Sep. 23, 2019

(65) Prior Publication Data

US 2020/0019877 A1    Jan. 16, 2020

Related U.S. Application Data

(63) Continuation of application No. 14/744,475, filed on Jun. 19, 2015, now Pat. No. 10,460,251.

(51) Int. Cl.
*G06N 20/00* (2019.01)
*G06N 3/044* (2023.01)
*G06N 3/045* (2023.01)
*G06N 7/01* (2023.01)

(52) U.S. Cl.
CPC ............ *G06N 7/01* (2023.01); *G06N 3/044* (2023.01); *G06N 3/045* (2023.01)

(58) Field of Classification Search
None
See application file for complete search history.

(56) References Cited

U.S. PATENT DOCUMENTS

| | | |
|---|---|---|
| 5,598,509 A | 1/1997 | Takahashi et al. |
| 5,627,941 A | 5/1997 | Takahashi et al. |
| 5,785,653 A | 7/1998 | Kiyuna et al. |
| 9,635,285 B2 | 4/2017 | Teich et al. |
| 10,360,515 B2 | 7/2019 | Arai |

(Continued)

FOREIGN PATENT DOCUMENTS

| | | | |
|---|---|---|---|
| JP | H06-075934 A | | 3/1994 |
| JP | H07-301413 A | | 11/1995 |

(Continued)

OTHER PUBLICATIONS

S.H. Yang et al., "Neural network based fault diagnosis using unmeasurable inputs", Engineering Applications of Artificial Intelligence., vol. 13, No. 3, 2000, pp. 345-356.

(Continued)

*Primary Examiner* — David R Vincent
(74) *Attorney, Agent, or Firm* — Foley & Lardner LLP

(57) ABSTRACT

Apparatus, methods, and systems for cross-domain time series data conversion are disclosed. In an example embodiment, a first time series of a first type of data is received and stored. The first time series of the first type of data is encoded as a first distributed representation for the first type of data. The first distributed representation is converted to a second distributed representation for a second type of data which is different from the first type of data. The second distributed representation for the second type of data is decoded as a second time series of the second type of data.

27 Claims, 8 Drawing Sheets

(56) References Cited

U.S. PATENT DOCUMENTS

| | | | |
|---|---|---|---|
| 2005/0186327 A1* | 8/2005 | Saito | G01N 25/72 |
| | | | 427/8 |
| 2008/0101668 A1* | 5/2008 | Boyden | G06T 5/006 |
| | | | 382/128 |
| 2008/0137105 A1 | 6/2008 | Howard et al. | |
| 2009/0040367 A1 | 2/2009 | Zakrzewski et al. | |
| 2009/0086905 A1 | 4/2009 | Boyden et al. | |
| 2012/0190981 A1 | 7/2012 | Harris et al. | |
| 2013/0178953 A1* | 7/2013 | Wersborg | G05B 19/4083 |
| | | | 700/48 |
| 2014/0096146 A1 | 4/2014 | Maor et al. | |
| 2014/0236050 A1 | 8/2014 | Lee et al. | |
| 2016/0034809 A1* | 2/2016 | Trenholm | G06N 3/0454 |
| | | | 706/20 |
| 2016/0098844 A1* | 4/2016 | Shaji | G06T 9/002 |
| | | | 382/156 |
| 2017/0220879 A1* | 8/2017 | Nakamura | G06V 10/50 |

FOREIGN PATENT DOCUMENTS

| | | |
|---|---|---|
| JP | H08-131413 A | 5/1996 |
| JP | 2007-240464 A | 9/2007 |
| JP | 2009-222620 A | 10/2009 |
| JP | 2016-071597 A | 5/2016 |
| WO | WO 2014/207545 | 12/2014 |
| WO | WO-2014/207545 A1 | 12/2014 |

OTHER PUBLICATIONS

Thomas M. Cover and Joy A. Thomas et al., "Elements of Information Theory, Second Edition, Chapter 15, Network Information Theory", pp. 509-611, Apr. 7, 2005.

Tomas Mikolov, Armand Joulin, Sumit Chopra, Michael Mathieu & Marc'Aurelio Ranzato et al., "Learning Longer Memory in Recurrent Neural Networks" Facebook Artificial Intelligence Research, Apr. 2015 (pp. 1-9).

International Search Report and Written Opinion of the International Searching Authority mailed Mar. 29, 2016, in International Application No. PCT/US16/14441 (WO 2016-204818).

Subhashini Venugopalan et al., "Sequence to Sequence—Video to Text," May 12, 2015 (10 pages).

Chung et al., "Emperical Evaluation of Gated Recurrent Neural Networks on Sequence Modeling", University of Montreal, Dec. 11, 2014 (9 pages).

Chung et al., "A Recurrent Latent Variable Model for Sequential Data", Department of Computer Science and Operations Research, University of Montreal, Jun. 19, 2015 (9 pages).

Graves et al., "Multi-Dimensional Recurrent Neural Networks", May 14, 2007 (10 pages).

Graves, "Generating Sequences With Recurrent Neural Networks", Department of Computer Science, University of Toronto, Jun. 5, 2014 (43 pages).

Hochreiter et al., "Long Short-Term Memory", Neural Computation, 1997, vol. 9, No. 8 (32 pages).

Kingma et al., "Auto-Encoding Variational Bayes", University of Amsterdam, May 1, 2014 (21 pages).

Kingma et al., "Semi-supervised Learning with Deep Generative Models", University of Amsterdam, Oct. 31, 2014 (9 pages).

Mikolov et al., "Learning Longer Memory in Recurrent Neural Networks", Facebook Artificial Intelligence Research, Dec. 2014 (9 pages).

Sutskever et al., "Sequence to Sequence Learning with Neural Networks", retrieved from http://papers.nips.cc/paper/5346-sequence-to-sequence-learning-with-neural-networks.pdf (9 pages).

Search Report and Written Opinion dated Mar. 29, 206 issued for international PCT Application No. PCT/US2016/014441 filed on Jan. 22, 2016.

Ajaya Kumar pani et al., "Neural Network Soft Sensor Application in Cement Industry: Prediction of Clinker Quality Parameters," Process Automation, Control and Computing (PACC), 2011 International Conference on, IEEE, Jul. 20, 2011, pp. 1-6.

Akiba et al., "Efficient Top-k Shortest-Path Distance Queries on Large Networks by Pruned Landmark Labeling," AAAI'15 Proceedings of the Twenty-Ninth AAAI Conference on Artificial Intelligence, pp. 2-8 (2015).

Akiba et al., "Fast Exact Shortest-Path Distance Queries on Large Networks by Pruned Landmark Labeling," Sigmod '13, (Jun. 22-27, 2013), 12 pages.

Graves et al., "Neural Turing Machines," arXiv:1410.5401v1 (Oct. 20, 2014), pp. 1-26.

Hinton et al., "Dark knowledge," Google Inc., pp. 1-39 (Oct. 31, 2014), available online, <URL: https://web.archive.org/web/20141031090612/https://www.ttic.edu/dl/dark14.pdf>.

Hinton et al., "Transforming Auto-Encoders," ICANN 2011, Part I, LNCS 6791, pp. 44-51 (2011).

Kuniaki Noda et al., "Intersensory synchrony modeling and memory retrieval using deep neural networks," Proceedings of the 28th Annual Conference of the Japanese Society for Artificial Intelligence, May 2014, pp. 1-2, 3H 4-OS-24b-3, with Machine English translation.

* cited by examiner

CROSS-DOMAIN TIME SERIES DATA CONVERSION APPARATUS, METHODS, AND SYSTEMS

CROSS-REFERENCE TO RELATED PATENT APPLICATIONS

This application is a Continuation of U.S. application Ser. No. 14/744,475, filed Jun. 19, 2015, incorporated herein by reference in its entirety.

BACKGROUND

A time series is a sequence of data points, typically consisting of successive measurements made over a time interval. Time series data is used in a wide variety of applications, and is often analyzed to extract meaningful information about a time series and/or to forecast future events or time series values. For example, time series data may be analyzed using machine learning techniques. A variety of types of machine learning methods exist (e.g., linear regression model, naïve Bayes classifier). Machine learning is commonly used for addressing "Big Data" problems in which the volume, variety, and velocity of data are high and/or real time data processing may be desired. There are many different domains from which time series data can be collected, many types of time series data, and many different sources from which time series data may be collected or generated. Typically, for a particular method of time series analysis or machine learning, a specific type of time series data is input to produce the desired results, such as a detection or prediction of some characteristic or event.

SUMMARY

The present disclosure provides a new and innovative apparatus, methods, and systems for cross-domain time series data conversion. In an example embodiment, a method includes receiving a first time series of a first type of data, storing the first time series of the first type of data, encoding the first time series of the first type of data as a first distributed representation for the first type of data, converting the first distributed representation to a second distributed representation for a second type of data which is different from the first type of data, and decoding the second distributed representation for the second type of data as a second time series of the second type of data.

In an example embodiment, an apparatus includes a data collection device configured to collect a first type of data over a period of time, a memory configured to store time series data collected by the data collection device, an encoder configured to convert the first time series of the first type of data into a first distributed representation for the first type of data, a data type converter configured to convert the first distributed representation into a second distributed representation for a second type of data which is different from the first type of data, and a decoder configured to convert the second distributed representation for the second type of data into a second time series of the second type of data.

In an example embodiment, an apparatus includes a memory configured to store time series data collected by a data collection device and distributed representation data, a first encoder configured to convert a first time series of the first type of data into a first distributed representation for the first type of data, a first decoder configured to convert the first distributed representation for the first type of data into the first time series of the first type of data, a first data type converter configured to convert the first distributed representation into a second distributed representation for a second type of data which is different from the first type of data, a second data type converter configured to convert the second distributed representation into the first distributed representation, a second encoder configured to convert a second time series of the second type of data into the second distributed representation for the second type of data, a second decoder configured to convert the second distributed representation for the second type of data into the second time series of the second type of data, a third data type converter configured to convert the first distributed representation into a third distributed representation for a third type of data which is different from the first type of data and the second type of data, a fourth data type converter configured to convert the third distributed representation into the first distributed representation, a third encoder configured to convert a third time series of the third type of data into the third distributed representation for the third type of data, and a third decoder configured to convert the third distributed representation for the third type of data into the third time series of the third type of data.

Additional features and advantages of the disclosed method and apparatus are described in, and will be apparent from, the following Detailed Description and the Figures.

DETAILED DESCRIPTION OF EXAMPLE EMBODIMENTS

Figure 1:
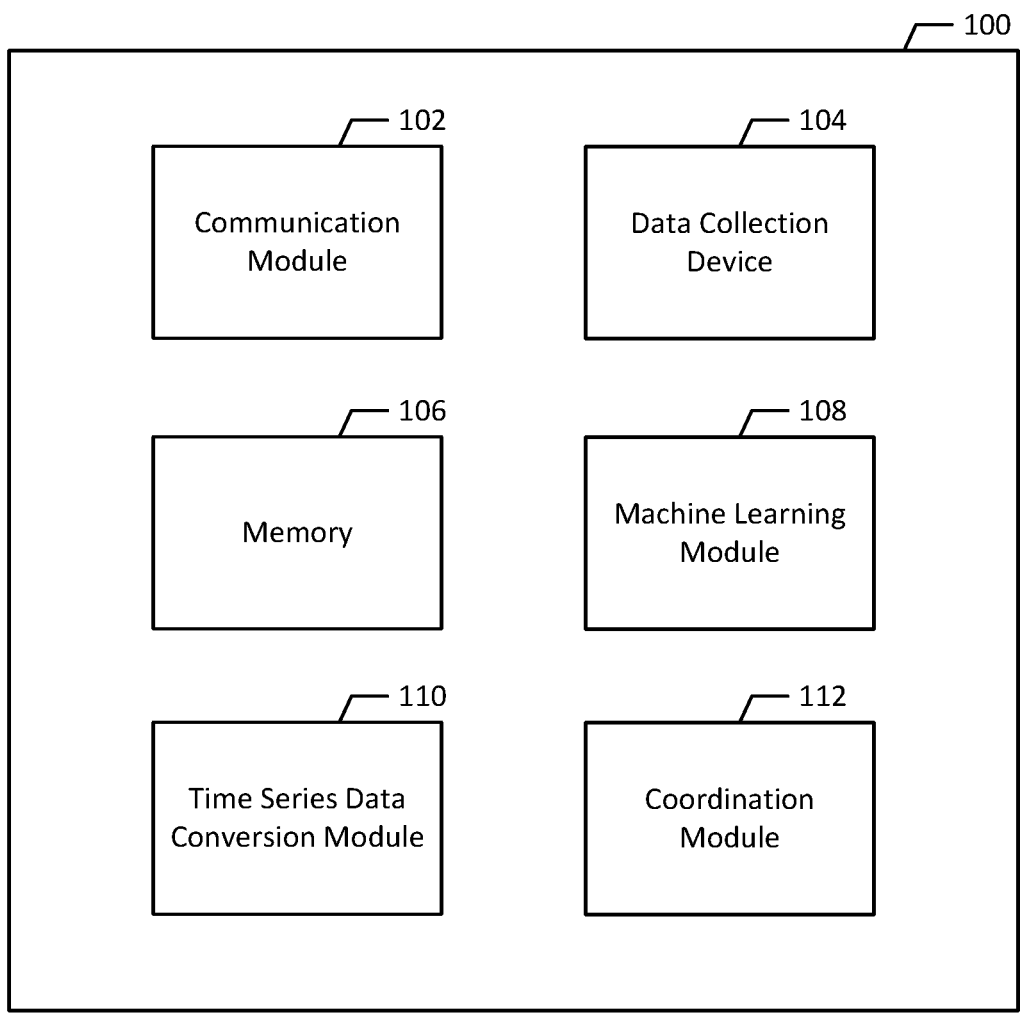
FIG. 1 is a block diagram of an example of an edge device, according to an example embodiment of the present disclosure.

FIG. 1 is a block diagram of an example of an edge device 100, according to an example embodiment of the present disclosure. In an example embodiment, the edge device 100 may be a thermal video camera. In another example embodiment, the edge device 100 may be an ultrasound detector. The example edge device 100 is a device that is capable of performing communication with other devices, performing data collection, performing machine learning, and performing time series data conversion. In an example embodiment, an edge device 100 is on the edge, or outermost layer, of a large distributed network of data connected devices, including central servers, intermediate servers, data repositories, gateways, routers, and the like. Edge devices 100 may include a wide variety of devices including recording devices (e.g., digital cameras, video cameras, audio recorders), city management devices (e.g., parking sensors, traffic sensors, water quality devices), vehicles (e.g., cars, trucks, airplanes), body sensors (e.g., activity sensors, vital signs sensor, pedometers), environmental sensors (e.g., weather sensors, pollution sensors, air quality sensors), wearable computing devices (e.g., smart watch, glasses, clothes), personal computing devices (e.g., mobile phone, tablet, laptop), home devices (e.g., appliances, thermostats, light systems, security system), advertising devices (e.g., billboards, information kiosks), etc. The edge device 100 may include a communication module 102, a data collection device 104, a memory 106, a machine learning module 108, a time series data conversion module 110, and a coordination module 112.

The communication module 102 is configured to communicate with other devices including other edge devices 100 of the same type (e.g., multiple thermal video cameras) or of a different type (e.g., a thermal video camera and an ultrasound detector). For example, as described in further detail below, the communication module 102 may be configured to communicate with other devices via one or more networks or communications channels, including the Internet, or any suitable wide area network, local area network, gateway, or other communication channel or network. For example, the communication module 102 may be configured for wireless communications via multiple protocols employed by cellular networks (e.g., 4G, 3G, GSM), wireless local area network (e.g., Wi-Fi), satellite (e.g., VSAT), or any suitable form of wireless communication (e.g., Bluetooth, RFID, NFC, IrDA, Li-Fi). Also, for example, the communication module 102 may be configured for a wired connection to another edge device 100 (e.g., Ethernet, DSL, USB, RS-232, coaxial cable). Further, the communication module 102 may communicate with a user, for example, via a graphical user interface which may be implemented with a touch screen display. The user may be able to request the edge device 100 to perform a specific task and/or receive information from the edge device 100. Thus, the communication module 102 may include hardware and/or software configured to communicate via one or more communication interfaces using one or more communication protocols.

A data collection device 104 may be a sensor, detector, or any device suitable for real time collection of data representative of real world characteristics (e.g., ultrasound levels, speed, acceleration, items in a shopping cart, hand movements, shapes, temperature, angles, voice recognition, word recognition, torque, slip levels). The data collection device 104 may receive a continuous data stream or collect data on a periodic basis (e.g., every millisecond, second, minute), which may generally depend on the type of data being collected and the variability of the data stream. A time series of data type X may be referred to herein as x, where $x=<x_1, x_2, x_3, \ldots x_i>$. A data collection device 104 typically includes specific hardware and/or physical structures specifically configured to collect a certain type of data (e.g., an image sensor, an ultrasonic sensor, an accelerometer, a gyroscope sensor, a thermometer, an altimeter, a Hall effect sensor, a velocimeter, a photodetector, a bolometer, a flow sensor, a strain gauge, a torque sensor, a tachometer, a clinometer, a microphone, a magnetometer, a voltmeter, an ammeter, an ohmmeter, a chemical sensor, a pressure sensor, a rain sensor, a hygrometer, a humistor, an anemometer, a seismometer, a Geiger counter, etc.). In an example embodiment, one edge device 100 may include multiple different data collection devices 104 that collect different types of data. The data collection device 104 provides the collected data to the memory 106. In an example embodiment, the memory 106 may be specialized memory for receiving and storing large amounts of data, such as video image data (e.g., VRAM). Thus, the memory 106 may have specialized hardware that is task specific, for example, to meet high throughput and low latency specifications of the edge device 100. The memory 106 may include different tiers of memory, such as buffers, shift registers, and the like. The memory 106 may be configured to store the collected data temporarily, and may be overwritten once the collected data is no longer needed by the machine learning module 108 and/or the time series data conversion module 110.

A machine learning module 108 may execute a machine learning model using the time series data collected by the data collection device 104 and stored in memory 106. The machine learning module 108 receives the collected time series data as inputs and executes the machine learning model using the collected data to make a forecast, a prediction, a classification, a clustering, an anomaly detection, and/or a recognition, which is then output as a result. The machine learning model may iteratively update the result. For example, the machine learning model may continuously execute using all available collected data stored in memory, and may produce a continuous result or a periodic result. If the volume and velocity of data collected is relatively low (sparse and/or slow), for example, the machine learning model may only periodically execute, and may be dormant for a period of time after each result is output, while new data is collected. Each machine learning model relates to a predefined task (e.g., detecting a faulty steam trap, prediction of an item, recognition of sweethearting theft, recognition of a suspect for a be-on-the-lookout (BOLO) alert, classification of cornering speeds). For example, for a machine learning model for an ultrasound detector edge device 100, the predefined task may be detecting a faulty steam trap. The ultrasound detector edge device 100 may be mounted on equipment (e.g., a steam trap on a boiler) in a manufacturing facility, and may detect a time series of ultrasound decibel levels at different frequencies. The machine learning module 108 of the ultrasound detector edge device 100, using the detected time series of ultrasound levels, may output a detection that a steam trap is developing a problem. The detection may provide an early warning that a steam trap may be plugged, leaking, or blowing, which may allow preventative maintenance to occur which may avoid a more costly failure and/or more downtime for a boiler, especially in the case of fast acting steam traps. The ultrasound detector edge device 100 may provide optimal early detection of steam trap problems, however, ultrasound decibel levels are often difficult to collect, as it may be manpower intensive and/or physically problematic (e.g., high elevation, obstructed access). Thus, it may not be practicable to use the ultrasound detector edge device 100 for all steam traps in a facility.

Another edge device 100 which may be used for detecting a faulty steam trap is thermal video imaging or infrared video thermography. Thermal video images may be converted into a matrix representing temperature changes in each section of the images of the steam trap. Ultrasound levels may produce an earlier indication of a problem than thermal video imaging or other techniques for detecting faulty steam traps. In general changes in ultrasound decibel levels may appear prior to an increase in temperature or an increase in low-frequency vibration levels, so ultrasound levels generally provide the best detection of problems for steam traps. However, thermal video imaging is typically easier to collect because a thermal video camera may collect data from a distance. Also, thermal video images may appear to show that fast acting steam traps are malfunctioning when they are actually not malfunctioning. Accordingly, a trade off between cost and quality of fault detection and ease of implementation may exist in many cases. Thermal video imaging data cannot directly be used as an input of the ultrasound level machine learning model which detects steam trap faults because these two data types are in different domains. Although the same task is being performed, different machine learning models are used by a machine learning module 108 for the different types of data (e.g., thermal video image data and ultrasound level data). These two types of data both provide information about the same phenomenon (or are correlated with an underlying phenomenon), which allows for a time series conversion between these data types.

A time series data conversion module 110 is configured to convert a first type of time series data (e.g., thermal video pixel data) into a different second type of time series data (e.g., ultrasound levels data), which is desired. A desired type of data may be referred to as a target type of data or target time series data. As described in greater detail below, time series data conversion may be performed using distributed representations. Time series data conversions may be trained using a variety of methods. In an example embodiment, an autoencoder using a recurrent neural network is used to determine a distributed representation for particular type of time series data (e.g., thermal video image of a steam trap). The distributed representation is a version of time series data that has reduced dimensionality but generally preserves the most important information, and in some cases may be nearly lossless. The time series data conversion module 110 may convert a time series of a first data type (e.g., thermal video pixel data) into a distributed representation of the first type, then, convert the distributed representation of the first type to a distributed representation of a second type (e.g., ultrasound levels data), and may then convert the distributed representation of the second type into time series data of the second type, or the target time series data. Thus, for example, a thermal video camera may collect time series data, which may be converted into ultrasound level data, which may then be input into a machine learning model that provides improved detection of faulty steam traps in comparison to a machine learning model which uses thermal video data as its input. The different data types may be in entirely different domains (e.g., video image, ultrasound, voltage, acceleration, temperature, radioactivity). Conversion of data between domains is referred to herein as cross-domain data conversion.

A coordination module 112 may coordinate the processes of the communication module 102, the data collection device 104, the memory 106, the machine learning module 108, and the time series data conversion module 110. An edge device 100 may have a central processing unit, and may also have one or more additional processors dedicated to various specific tasks. Each edge device 100 may use one or more processors, memories, buses, and the like. Also, each one of the communication module 102, the data collection device 104, the memory 106, the machine learning module 108, the time series data conversion module 110, and the coordination module 112 may use one or more processors, memories, buses, and the like. A processor, memory, and any other component may be shared by one or more of the communication module 102, the data collection device 104, the memory 106, the machine learning module 108, the time series data conversion module 110, and the coordination module 112. In an example embodiment, each one of the communication module 102, the data collection device 104, the memory 106, the machine learning module 108, the time series data conversion module 110, and the coordination module 112 uses some dedicated hardware and software that is distinct from each other module or component.

Figure 2:
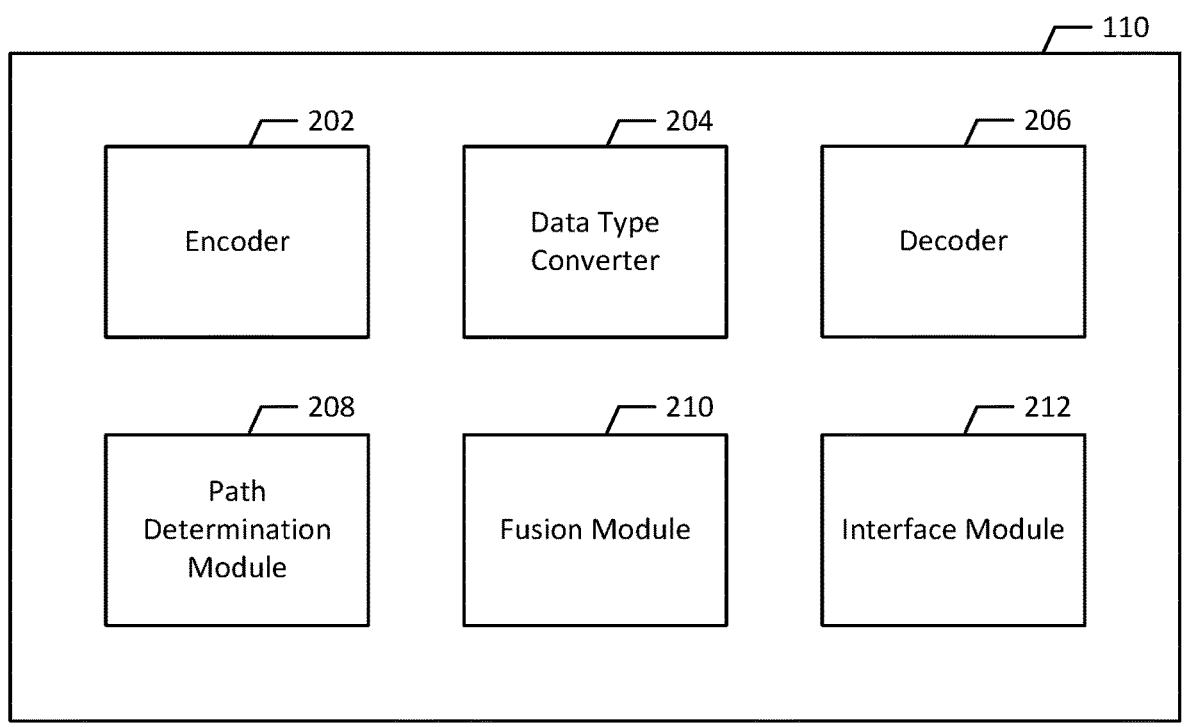
FIG. 2 is a block diagram of an example time series data conversion module, according to an example embodiment of the present disclosure.

FIG. 2 is a block diagram of an example time series data conversion module 110, according to an example embodiment of the present disclosure. The time series data conversion module 110 may include an encoder 202, a data type converter 204, a decoder 206, a path determination module 208, a fusion module 210, and an interface module 212. The encoder 202 receives time series data (e.g., thermal video pixel data over a period of time) and encodes the time series data as a distributed representation (e.g., dense representation of thermal video temporal features). An encoder 202 for a data type X may be trained using a set of time series $\{x_1, x_2, \ldots x_n\}$, all of data type X (e.g., using an autoencoder). The data type converter 204 converts a distributed representation of one data type (e.g., thermal video data) into a distributed representation of a different target data type (e.g., ultrasound level data). The decoder 206 decodes a distributed representation (e.g., dense representation of ultrasound temporal features) as a target time series (e.g., ultrasound decibel levels of several frequencies over a period of time). A decoder 206 for a data type Y may be trained using a set of time series $\{y_1, y_2, \ldots y_n\}$, all of data type Y (e.g., using an autoencoder). A distributed representation for a data type X may be referred to herein as DR(x). A data type converter 204 from data type X to data type Y may be trained using a data set of pairs (DR(x), DR(y)) (e.g., using recurrent neural network techniques). Accordingly, collected time series data that is desired to be analyzed may be converted from one type to another type using the encoder 202, the data type converter 204, and the decoder 206.

Further, multiple conversions may occur in series and/or in parallel. For example, it may be desirable to convert a data type A into a target data type C, however, it may not be possible to perform a conversion directly from data type A to data type C. In this case, if data type A can be converted into a data type B, which can be converted into data type C, then a serial set of conversions may allow the data to be converted indirectly through intermediate data type B. In some cases, for example, in a system with dozens of data types, there may be many conversion paths that could be employed to convert a collected time series into a different type of data. As the number of data types which may need to be converted increases, a combinatorial explosion may occur in the number of possible conversion paths that are possible. The path determination module 208 determines which conversion path should be used to perform such conversions. The fusion module 210 fuses data of different data types to form more robust, information-rich data types that are better suited for producing reliable, accurate, precise and/or quick recognition results in machine learning analysis or the like. For example, ultrasound level time series data may be fused with thermal video image data, which may result in a richer, more robust data type. The interface module 212 is an interface between the time series data conversion module 110 and other modules or components within the edge device 100 (e.g., memory 106, communication module 102, data collection device 104, machine learning module 108, coordination module 112, another time series data conversion module 110 outside the edge device 100).

It should be appreciated that the time series data conversion module 110 illustrated in FIG. 2 is merely a non-limiting example, as a time series data conversion module 110 may include multiple different encoders 202, multiple different data type converters 204, multiple different decoders 206, and/or multiple different fusion modules 210, or the like depending on the circumstances. In some cases, an edge device 100 will only have one purpose, collecting a specific type of time series data, encoding the collected time series data as a distributed representation, converting that distributed representation into a distributed representation of different type of data (i.e., the target data type), decoding that distributed representation as a different type of time series than the collected data (i.e., the target time series), and executing a machine learning module 108 using the different type of time series data. For example, such edge devices 100 may be hard coded to perform specific data collection, data conversion, and machine learning tasks (e.g., using an ASIC). However, some edge devices 100 may be multi-purpose machines that may be requested to handle a variety of different tasks at different times or simultaneously, be configurable to handle new tasks as needed, or the like. These edge devices 100 typically have many different encoders 202, data type converters 204, and decoders 206, and may include configurable software modules which can add and/or update encoders 202, data type converters 204, decoders 206, path determination modules 208, and/or fusion modules 210. Moreover, a single device may include the ability to perform many different types of conversions. Such a device may be referred to as a hub device.

Figure 3:
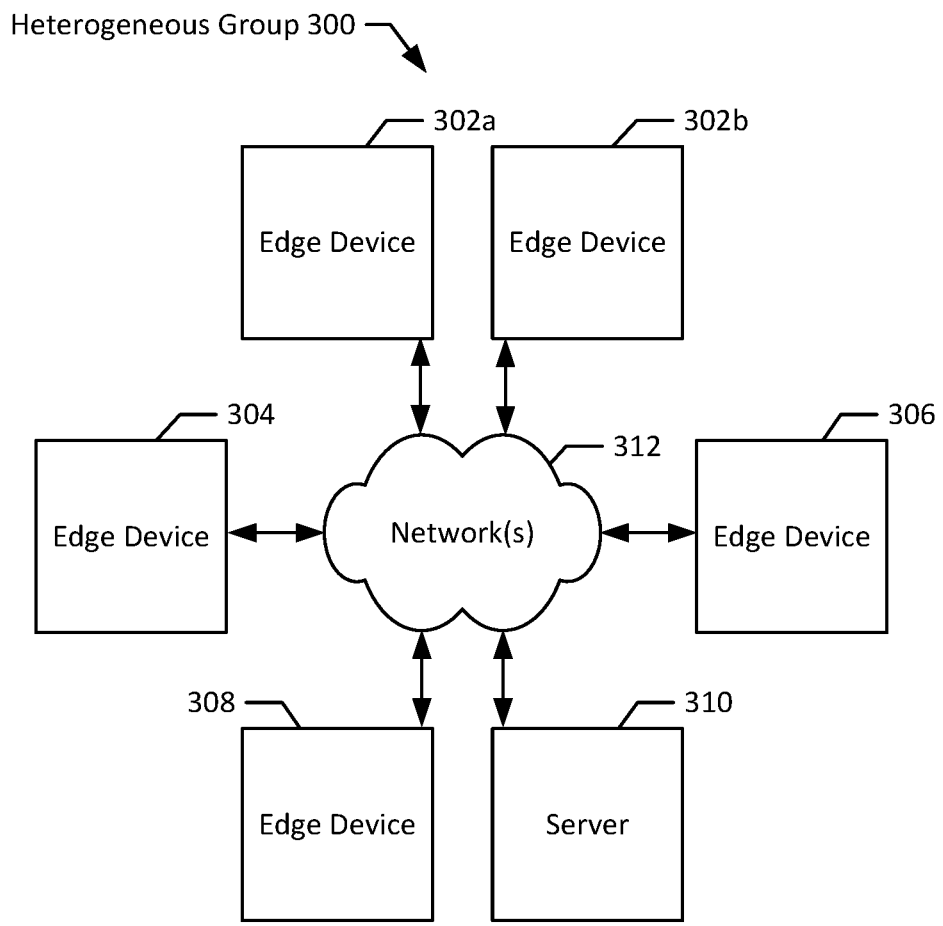
FIG. 3 is high-level block diagram illustrating a heterogeneous group of edge devices, according to an example embodiment of the present disclosure.

FIG. 3 is high-level block diagram illustrating a heterogeneous group of edge devices, according to an example embodiment of the present disclosure. The heterogeneous group 300 includes two edge devices 302a and 302b, which are both the same type of edge device 100 (e.g., both thermal video cameras 302). The heterogeneous group 300 also includes three more edge devices 304, 306, and 308, which are each different types of devices 100 (e.g., one ultrasound detector, one multi-axial accelerometer, and one thermistor). A server 310 may communicate with one or more of the edge devices 302a, 302b, 304, 306, 308 via a network 312. The server 310 may communicate with one or more edge devices 100. In an example embodiment, the server 310 is an intermediate server, which communicates with one or more edge devices 100 and with one or more different servers (e.g., a central server). In an example embodiment, server 310 may be part of a "cloud" which performs cloud computing.

The server 310 may provide information and/or commands to edge devices 100, and may receive information, for example, regarding history and/or accuracy of encoders 202, data type converters 204, decoders 206, and machine learning models. For example, the server 310 may provide an updated encoder 202, data type converter 204, decoder 206, or machine learning model based on a manufacturer update. The server 310 may perform many of the same functions as an edge device 100, but unlike an edge device 100, a server 310 does not perform data collection using a data collection device 104. A server 310 may be a hub device, and may provide data conversion to and from dozens or even hundreds of data types. The network 312 may include one or more networks and/or communication paths, and may be configured as a peer-to-peer network. In an example embodiment, the heterogeneous group 300 may be configured in any type of network 312 (e.g., LAN, WAN, Wi-Fi, BT, Z-wave, satellite, terrestrial, etc.) and may be configured in any suitable network topology (e.g., mesh, bus, grid, ring, star, tree, line). For example, the heterogeneous group 300 may be provided as a semi-connected mesh network of edge devices 302a, 302b, 304, 306, 308, with each type of edge device collecting a different type of time series data. In this scenario, the ability to convert time series data of a first type into a second type may be particularly advantageous. For example, if a preferable data type (e.g., ultrasound levels data) is only intermittently available, an inferior data type (e.g., thermal video imaging) may also be used for when the preferable data type is not available.

In an example embodiment, multiple different types of network communications (e.g., Wi-Fi, 4G, BT, NFC, Li-Fi, IrDA) may be used within a heterogeneous group 300. In an example embodiment, the network 312 may be a wireless mobile ad hoc mesh network (e.g., MANET, VANET, SPAN). In an example embodiment, the network 312 may be a scatternet. A group 300 is often susceptible to variations in the heterogeneous group 300. For example, edge devices 100 in the heterogeneous group 300 may unexpectedly lose communication with the group 300. For example, an edge device 100 may lose power (e.g., unplugged and/or batteries die), may be moved to an area with limited or no connectivity due to interference (e.g., mountains, rain), or may be turned off by a user. Thus, a heterogeneous group 300 may be operating in heterogeneous environment that is not static, but rather, may change dynamically with different edge devices 100 spontaneously and/or unexpectedly entering and leaving the heterogeneous group 300. Thus, if an edge device 100 collecting time series data of a first type becomes unavailable or loses connectivity, different types of collected time series data may need to be converted to a data type that can be input into a particular machine learning model in a machine learning module 108. Likewise, alternate data conversion paths may be required in the event that a preferred data conversion path becomes unavailable when a device with a required data type converter is not available. In an example embodiment, the heterogeneous group 300 may have edge devices 100 including one or more of thermal video cameras, ultrasound level detectors, accelerometers, thermistors, shopping carts, automobiles, surveillance cameras, automatic teller machines, GPS devices, medical devices, robots, remote controls, smoke detectors, head mounted displays, or any other edge device 100, as discussed in the present application. In an example embodiment, the heterogeneous group 300 includes a plurality of edge devices 100 which are part of the Internet of Things (IoT), which is rapidly growing and already includes billions of devices, which collect a vast array of different types of data. As the IoT continues to evolve, more and more types of time series data will be available from more and more edge devices 100 in many different domains.

Figure 4:
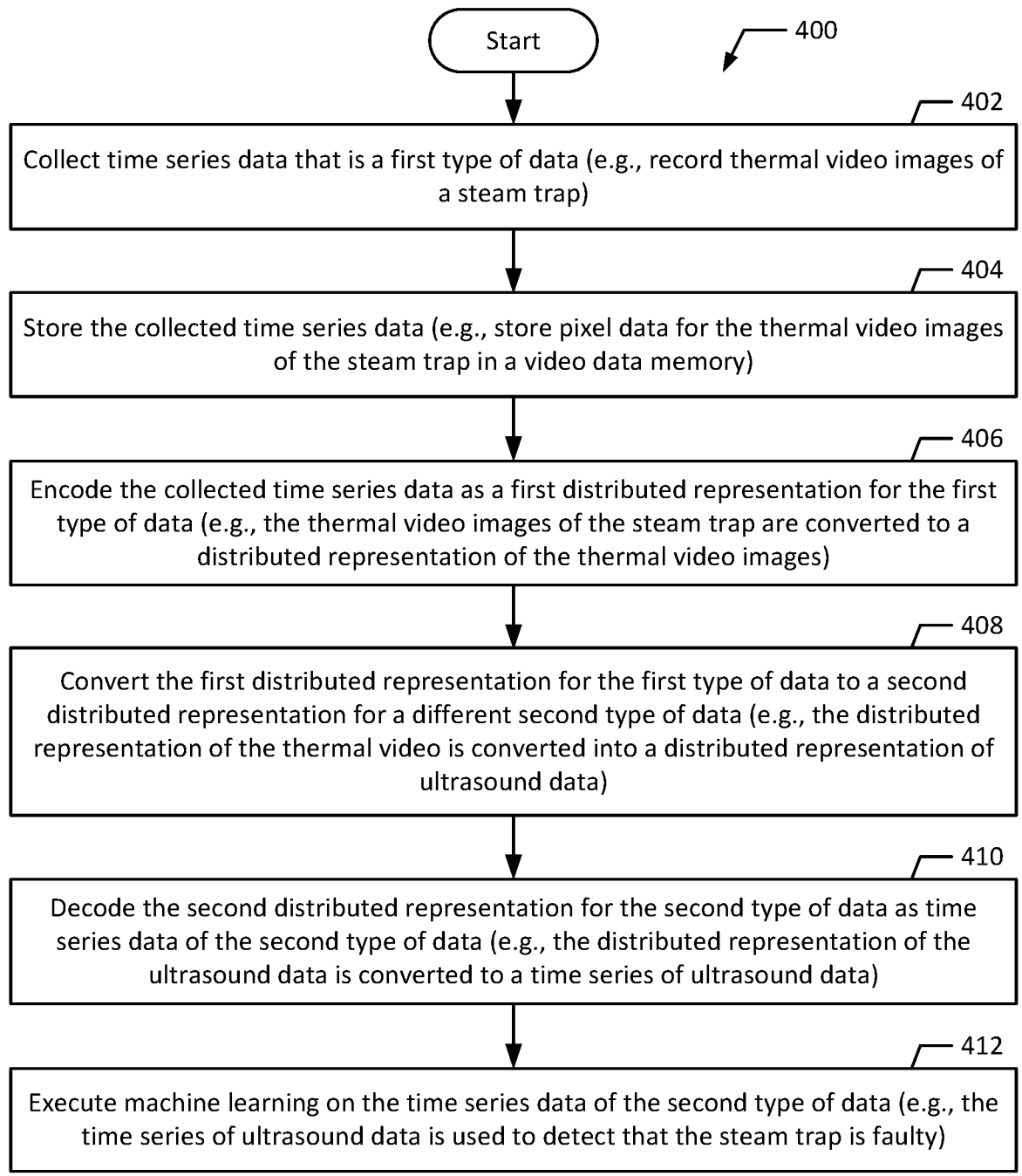
FIG. 4 is a flowchart illustrating an example process of time series data conversion, according to an example embodiment of the present disclosure.

FIG. 4 is a flowchart illustrating an example process for machine learning in a heterogeneous group of edge devices, according to an example embodiment of the present disclosure. Although the process 400 is described with reference to the flowchart illustrated in FIG. 4, it will be appreciated that many other methods of performing the acts associated with the process 400 may be used. For example, the order of some of the blocks may be changed, certain blocks may be combined with other blocks, certain blocks may be iteratively performed or repeated, and some of the blocks described are optional.

The example process 400 may begin with collecting time series data that is a first type of data (block 402). For example, thermal video images of a steam trap may be recorded for analysis of the steam trap, such as detecting any problems and/or indications that maintenance may be required. The collected time series data of the first data type is stored (block 404). For example, pixel data for the thermal video images of the steam trap is stored in a video data memory. In an example embodiment, a thermal video camera with 320×240 resolution may provide 76,800 pixels of raw data at each video frame or time step. The time series data is encoded as a first distributed representation for the first type of data (block 406). For example, the thermal video images of the steam trap are converted to a distributed representation of the thermal video images. In an example embodiment, the 76,800 pixels may be encoded as a distributed representation having 30 dimensions. Thus, at each time step, for example, the encoder 202 may receive a 76,800-tuple as an input, and output a distributed representation that is a 30-tuple. The distributed representation that is output may be far more dense and rich than the collected thermal video pixel time series data. Collected time series data is often noisy, but a distributed representation of the collected time series data extracts the most important information with minimal noise, and the distributed representation may capture time dependencies that are not apparent in the time series data.

The first distributed representation for the first type of data is converted to a second distributed representation for a different second type of data (block 408). For example, the distributed representation of the thermal video is converted into a distributed representation of ultrasound data, the target data type. In an example embodiment, the second distributed representation has an equal dimensionality as the first distributed representation (e.g., 30-tuple) or a different dimensionality (e.g., 18-tuple, 36-tuple). The second distributed representation for the second type of data is decoded as time series data of the second type of data (block 410). For example, the distributed representation of the ultrasound data is converted to a time series of ultrasound data. In an example embodiment, the target ultrasound time series data includes decibel levels for each of many different specific frequencies within the ultrasound range. The ultrasound time series data may be the same data type as that which would be provided by an ultrasound detector. Moreover, the accuracy of the decoded time series data may be very close to time series data that would have been provided by the actual ultrasound detector. In an example embodiment, the decoder 202 may output a 160-tuple as an output. Machine learning is executed using the time series data of the second type of data (block 412). For example, the ultrasound time series data is used to detect that the steam trap is faulty. The target time series may be used in a forecasting model (e.g., autoregressive integrated moving average) or a detection or classification model (e.g., support vector machine, random forest), the output of which may be transmitted to a user device. A user may be notified of a problem via a user interface on the user device, and may take corrective or precautionary action accordingly. The example process 400 provides for cross-domain time series data conversion, and advantageously allows for faster and more reliable detection of a faulty steam trap than using a thermal video imaging machine learning model. Thus, the advantages of improved accuracy and reliability of using ultrasound detection are provided, without the disadvantages of generally more difficult and/or expensive data collection, via the presently disclosed cross-domain time series data conversion.

Figure 5:
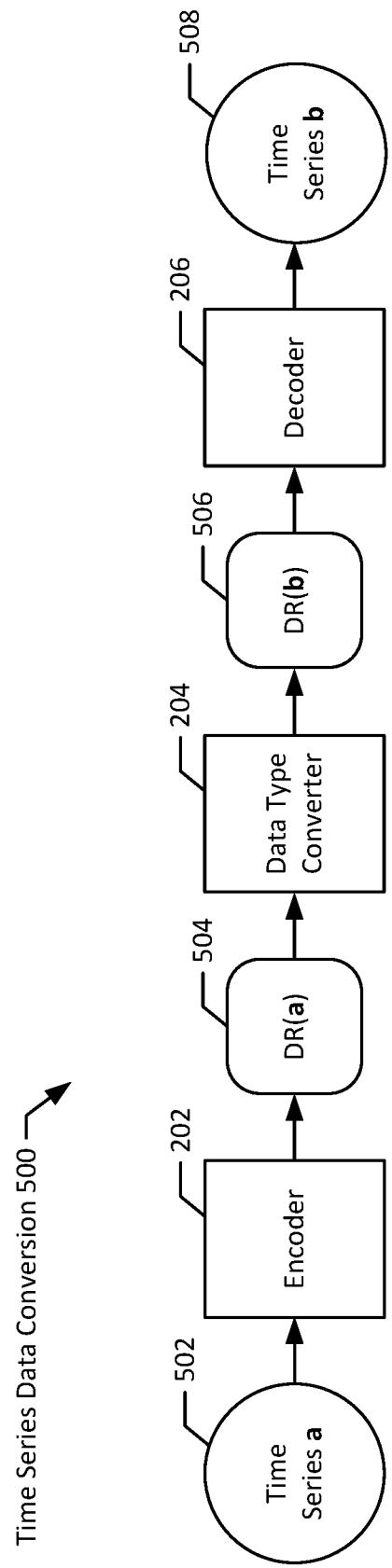
FIG. 5 is a flow diagram illustrating an example process for time series data conversion, according to an example embodiment of the present disclosure.

FIG. 5 is a flow diagram illustrating an example process for time series data conversion, according to an example embodiment of the present disclosure. Although the process 500 is described with reference to the flow diagram illustrated in FIG. 5, it will be appreciated that many other methods of performing the acts associated with the process 500 may be used. For example, the order of some of the blocks may be changed, certain blocks may be combined with other blocks, certain blocks may be iteratively performed or repeated, and some of the blocks described are optional or may be performed by different devices.

Certain types of industrial equipment may require monitoring to ensure that the equipment is operating properly and receiving maintenance as needed to avoid or delay failures that may incur costly downtime and/or repairs. In the example process 500, a user needs to use a machine learning model that uses data type B, however it is not practicable for the user to collect data type B (time series b 508), but the user can collect data type A (time series a 502). Thus, a time series a 502 (e.g., thermal video image data) is collected by a data collection device 104 (e.g., thermal video camera). The time series a may be stored in a memory 106 or processed in real-time as the data collection device 104 collects the time series a 502.

As a simplified example, each thermal video image in the time series a 502 is used to determine the difference in temperature between a steam trap and its surrounding ambient environment. A single thermal video image may contain multiple steam traps, but for simplicity, this example embodiment includes only one steam trap per thermal video image. The steam trap may be located in the center area of the video thermal image, with four surrounding areas directly adjacent to the sides of the steam trap (e.g., above, to the right, below, and to the left). Of course, a finer granularity of the surrounding areas and the steam trap itself may be used, but for simplicity of this example embodiment, the temperature of the steam trap is T, and the temperature of four surrounding areas are T1, T2, T3, and T4, respectively. Thus, the temperature information at a single time step can be represented as a 5-tuple: (T, T-T1, T-T2, T-T3, T-T4)=(T, $\Delta$T1, $\Delta$T2, $\Delta$T3, $\Delta$T4). This 5-tuple contains the temperature of the steam trap (T), and the temperature differentials between the steam trap and the surrounding areas ($\Delta$T1-$\Delta$T4). A time series or vector a represents the temperature information for four time steps in an exemplary time series. At each time step, there is a corresponding 5-tuple, as illustrated below in Table 1.

TABLE 1

| | $t_1$ | $t_2$ | $t_3$ | $t_4$ |
|---|---|---|---|---|
| a | $(T_1, \Delta T1_1,$ $\Delta T2_1, \Delta T3_1,$ $\Delta T4_1)$ | $(T_2, \Delta T1_2,$ $\Delta T2_2, \Delta T3_2,$ $\Delta T4_2)$ | $(T_3, \Delta T1_3, \Delta T2_3,$ $\Delta T3_3, \Delta T4_3)$ | $(T_4, \Delta T1_4, \Delta T2_4,$ $\Delta T3_4, \Delta T4_4)$ |

As explained below, the above time series a 502 will be converted into the target time series b 508 (e.g., ultrasound level data). Relevant ultrasound frequencies in this example embodiment may range from 1-20 MHz, and if measurements are made at many different frequencies, the time series may have a very high dimension. However, in this simplified example embodiment, ultrasound dB levels are collected only at three frequencies, $\alpha$, $\beta$, and $\gamma$. At each time step, ultrasound information is represented by a 3-tuple consisting of dB levels at those three respective frequencies. The time series or vector b represents the time series of ultrasound dB level information over four time steps, as illustrated below in Table 2.

TABLE 2

|   | $t_1$ | $t_2$ | $t_3$ | $t_4$ |
|---|---|---|---|---|
| b | $(\alpha_1, \beta_1, \gamma_1)$ | $(\alpha_2, \beta_2, \gamma_2)$ | $(\alpha_3, \beta_3, \gamma_3)$ | $(\alpha_4, \beta_4, \gamma_4)$ |

Exemplary sample data is illustrated below in Table 3, where $\Delta T1$ increases slightly, ultrasound dB levels at frequency a increase substantially.

TABLE 3

|   | $t_1$ | $t_2$ | $t_3$ | $t_4$ |
|---|---|---|---|---|
| a | (30, 0, 0, 0, 0.1) | (30, 0.1, 0, 0, 0.1) | (30, 0.5, 0, 0.1, 0.2) | (30, 1.0, 0, 0.2, 0.2) |
| b | (10, 12, 15) | (11.3, 12.1, 15.1) | (11.82, 12.2, 15.1) | (12.69, 12.3, 15.3) |

The above exemplary values of time series a illustrate why temperature time series data from thermal imaging may be less effective than ultrasound level time series data in quickly detecting problems in fast-acting steam traps. For example, the increase in $\Delta T1$ is relatively small at $t_2$ and it increases only minimally. The change in temperature may not be immediately recognizable or distinguishable from noise. If time series a were input into a detection model, the model may detect the problem, but only at a later time step. By contrast, in the ultrasound time series b, the value of a increases a significant amount immediately at $t_2$. This increase may allow a detection model using ultrasound data to detect a problematic steam trap earlier than a detection model using temperature data. In this example embodiment, a and b are measures of the same phenomenon, which results in an underlying relationship relating a to b. For example, $\Delta T1$ may be related to ultrasound dB level at a by a variation of the sigmoid function, which is non-linear and time dependent. It should be appreciated that this example embodiment, the time dependent relationships between time series a and time series b are greatly simplified only for ease of understanding, in contrast to a real-life application which may include hundreds or thousands of temperature differentials and hundreds of ultrasound frequencies.

After the time series a 502 has been collected, the time series a 502 is provided as the input to the encoder 202. The encoder 202 may include multiple layers between the input layer and the output layer, which outputs the distributed representation. The encoder 202 then encodes time series a and outputs DR(a) 504 (i.e., a distributed representation of the time series a). In the simplified example embodiment described with reference to Tables 1-3, the DR(a) 504 may be a 2-tuple, although typically, the dimensionality of a distributed representation would be significantly greater, and the reduction in dimensionality would be far greater. The DR(a) 504 may be provided directly from the output of the encoder 202 to the input of the data type converter 204, stored in memory 106, and/or transmitted to another device via the communication module 102.

The data type converter 204 converts the DR(a) 504 into the DR(b) 506. Thus, the thermal image video data is transformed into ultrasound level data. Because the DR(a) 504 and the DR(b) 506 are dense representations of temporal features of the underlying phenomena captured in both respective time series a and b, it is possible to perform a data type conversion in less computation time, with less memory, and with possibly greater accuracy than would otherwise be possible. Typically, converting raw time series data of a first type to time series data of a different second type of data is not practicable from a computational standpoint, thereby requiring users to use sub-optimal data types for machine learning models (e.g., thermal video image models), which result in sub-optimal prediction or detection results, or alternatively, use burdensome methods to obtain optimally useful data (e.g., extra man-hours to obtain ultrasound level data). However, according to the present disclosure's advantageous features, it may be more practicable to train the data type converter 204 to allow for use of pre-existing machine learning models (e.g., using data type B), rather than train a new machine learning model for each type of collected time series (e.g., train a machine learning model for data type A).

The data type converter 204 provides the DR(b) 506 to the decoder 206, which decodes the DR(b) 506 to output the time series b 508. The decoder 206 may include multiple layers between the input layer, which receives the DR(b) 506 and the output layer, which outputs the time series b 508. The time series b 508 may then be used as the input to a machine learning model that uses data type B. The disclosed conversion of time series data may maintain the quality, or even improve the quality of the data by removing noise, thus providing improved accuracy in results output from machine learning models. Also, in an example embodiment, a machine learning model may receive a distributed representation as an input, rather than a time series. Accordingly, for example, it may be unnecessary for the decoder 206 to convert the DR(b) 506 into the time series b 508, if a machine learning model is configured to accept DR(b) 506 as its input.

It should be appreciated that the steam trap example using thermal video imaging as discussed above is merely exemplary, and conversion of time series data may relate to any type of data, and the associated machine learning models may relate to any suitable predefined task. A data collection device 104 may sense or detect any real world time series data from the surrounding environment to provide the time series data if it provides information relevant to any predefined task. In an example embodiment, a machine learning model may be directed to determining a target cornering speed for an automobile. For example, an automobile may include self-driving features, such as automatic braking based on a predicted collision, and alerts or alarms for the driver. In an example embodiment, an automobile may be an edge device 100 that includes data collection devices 104 such as a video camera for analyzing upcoming corners (e.g., curves or turns in the road). The data collection devices 104 may provide a data stream of time series data that is used to determine a sharpness of a bend, a slope of the road, and a camber of the road, a current speed or velocity, a slip angle, a tire-pavement friction, a weight of automobile, a distribution of weight, a moisture level, a temperature, etc. The machine learning model may output a target speed for each upcoming corner, which may be used by the automobile for applying the brakes, alerting the user of a dangerous condition, or the like. The collected video data may undergo one or more data conversion processes, including encoding, data type conversion, decoding, and/or fusion with other collected time series data (e.g., acceleration time series data, road camber time series data).

Figure 6A:
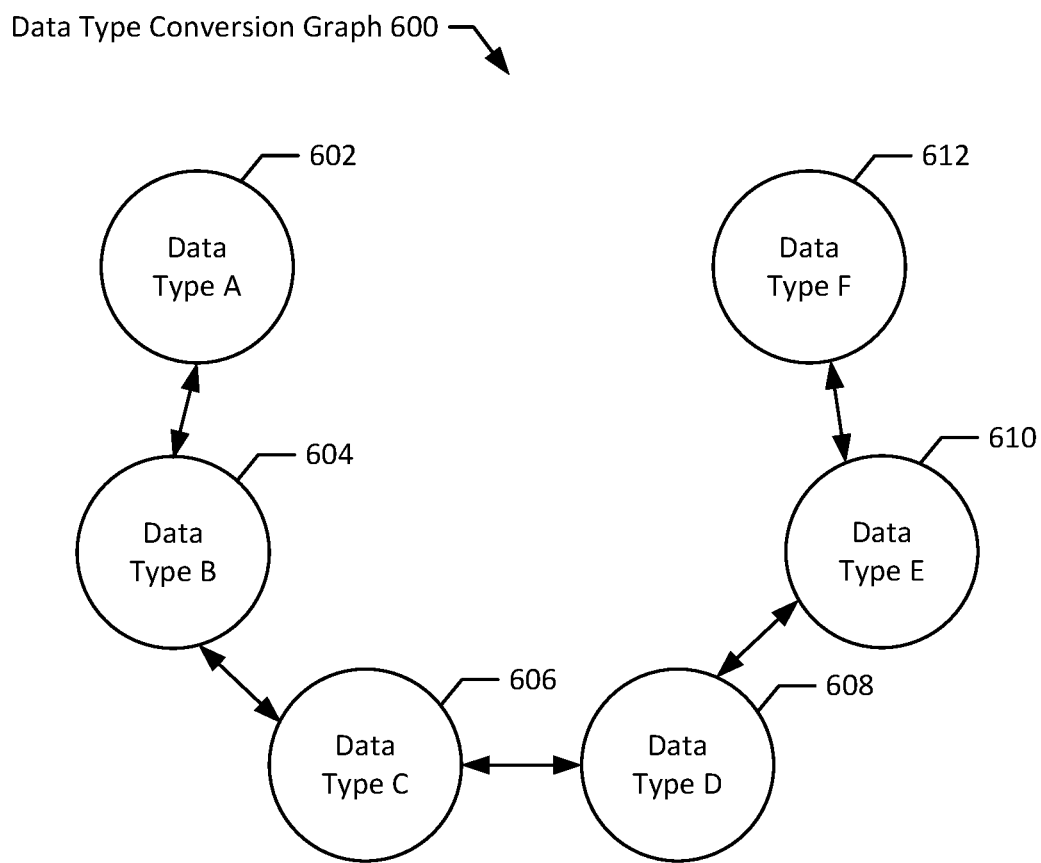
FIG. 6A is a block diagram illustrating a data type conversion graph, according to an example embodiment of the present disclosure.

FIG. 6A is a block diagram illustrating a data type conversion graph 600, according to an example embodiment of the present disclosure. As discussed above, multiple data type conversions may be required to convert an available data type into a desired data type. As shown in FIG. 6A, data types A, B, C, D, E, and F are represented as nodes 602, 604, 606, 608, 610, and 612, respectively. These data types may be converted according to the above discussed data conversion process, as represented by the connecting line segments. With reference to FIG. 5, time series a 502 and time series b 508 may correspond to data type A 602 and data type B 604, respectively. Thus, the connection between data type A 602 and data type B 604 may include an encoder 202 for time series a, an encoder 202 for time series b, a decoder 206 for time series a, a decoder 206 for time series b, a data type converter 204 for converting from DR(a) to DR(b), and a data type converter 204 for converting from DR(b) to DR(a). These components are omitted for brevity in this figure. Each connecting line segment between data types includes a data type converter 204. An encoder 202 or decoder 206 may not be required in each connecting line segment between data types, for example, if a multi-node conversion is required, and the input and output of the node will both be distributed representations.

In an example embodiment, data type A 602 is collected by an edge device 100 including a vibration sensor (e.g., accelerometer) located at a non-optimal position on a piece of manufacturing equipment. It should be appreciated that in many cases, it is not possible to mount an edge device 100 in an optimal location due to the particular environment, the size of the edge device 100, etc. Data type B 604 may be data collected by the same vibration sensor located in an optimal position on the piece of manufacturing equipment. Data type A 602 and data type B 604 may be for the vibration sensor manufactured by a first manufacturer, but the data type C 606 may be for the same type of vibration sensor that is manufactured by a different second manufacturer. Accordingly, the non-optimally positioned vibration sensor of a first manufacturer may provide time series data that can be converted to an optimally positioned vibration sensor of a second manufacturer. Thus, time series data collected from sensing equipment operating in various non-ideal placements and/or made by different manufacturers may all be converted to the same data type. This may allow all collected data to be used with pre-existing machine learning models that may already be owned or licensed by the user. In an example embodiment, data type D 608 may be infrared intensities, data type E 610 may be temperature levels, and data type F 612 may be ultrasound levels. Thus, available vibration data type A 602 may be converted into ultrasound data type F 612. Thus, each different data type may be data in entirely different domains, or may be a similar or the same type of data, but with some characteristic that causes the collected data to be different (e.g., different placement of sensors, different manufacturers, different time period or sampling frequency, different altitudes, different ambient air temperature). Thus, different sources (e.g., data collection devices 104) which provide generally the same type of data (e.g., vibration data) may be referred to herein as providing different types of data, to the extent that a data type conversion is provided that can convert data of one source to be equivalent to data of the other source, as described above. Thus, different types of data may be the same type of data from different sources, so all different data types are provided from different sources, and not all different sources provide different data types. Also, a single edge device 100 (e.g., an automobile) may have several different sources or sensors that provide various different types of data.

Figure 6B:
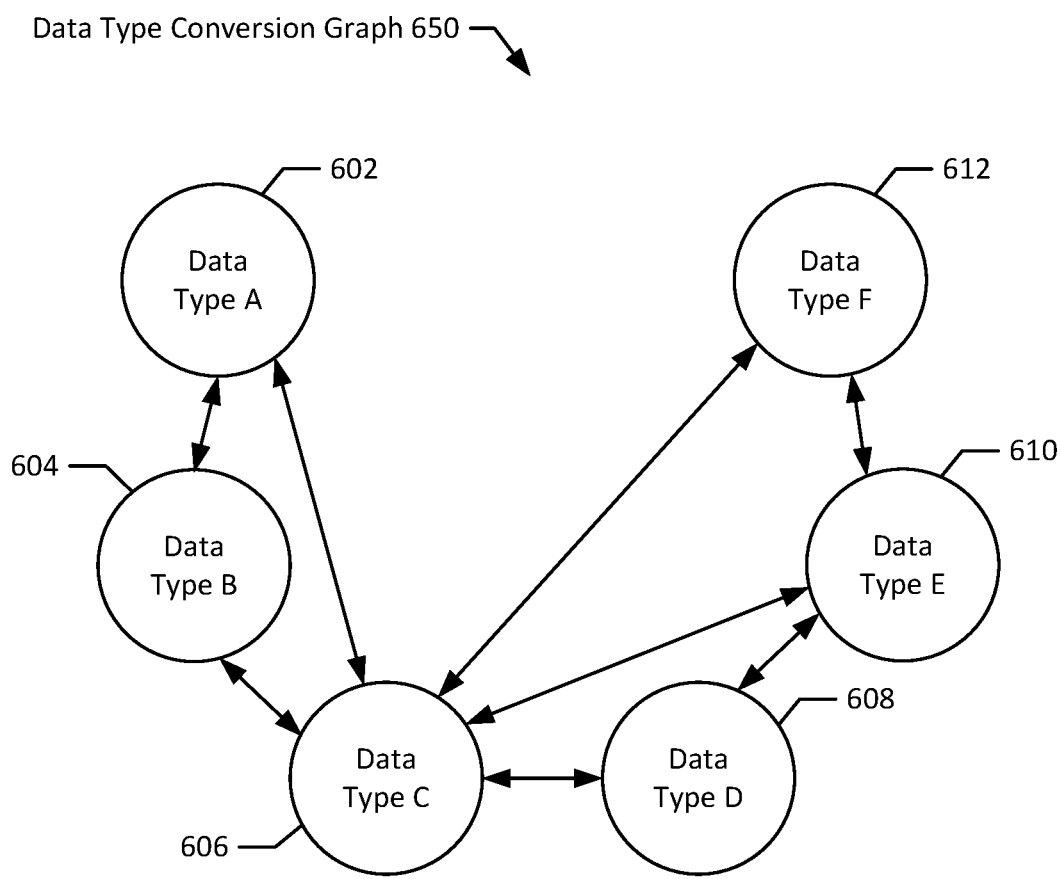
FIG. 6B is a block diagram illustrating a data type conversion graph, according to an example embodiment of the present disclosure.

As shown in FIG. 6A, a conversion of data type A 602 to data type F 612 would require five data conversions in series, through data type B 604, data type C 606, data type D 608, and data type E 610. In some cases, particularly if numerous data type conversions are required, degradation of the desired data to be output may occur, resulting in diminished accuracy. FIG. 6B is a block diagram illustrating a data type conversion graph 650, according to an example embodiment of the present disclosure. In FIG. 6B, the data type conversion graph 600 includes a data hub (e.g., data type C). In this case, rather than requiring five data type conversions from data type A to data type F, only two conversions are required. As shown in FIG. 6B, the data type C can be directly converted to or from any other data type in the data type conversion graph 650. However, even when a data hub is provided, it may still be typical to require multiple data type conversions. For example, data type F 612 cannot be directly converted to data type D 608. In this case, there are two sequences of two data type conversions (e.g., F to C and C to D, or F to E and E to D). In another example embodiment, there may be dozens, hundreds, or thousands of possible data type conversion sequences available. Accordingly, finding an optimal path through a data type conversion graph 650 may be performed by the path determination module 208.

In an example embodiment, determining a conversion path may be performed by the path determination module 208 as described below. For example, the accuracy of the conversion made by a connecting line segment may be represented as acc{e}, where $$0 \leq acc\{e\} \leq 1$$

If the conversion errors for each connecting line segment in the conversion path are independent, the error of using the path consisting of connecting line segments $e_1, e_2, e_3, \ldots e_m$ is upper bounded by $$\prod_{i=1}^{m} acc\{e_i\}$$

Taking the log of the product results in $$\sum_{i=1}^{m} \log(acc\{e_i\})$$

In order to find the optimal path with the smallest total conversion error, the path determination module 208 determines the maximum weighted path between nodes X and Y where each connecting line segment e is associated with a weight of $\log(acc\{e_i\})$. Thus, the path determination module 208 may determine a sequence of data type conversions that will occur when a multiple data type conversions are required.

In an example embodiment, the path determination module 208 may use the average (either unweighted or weighted) of the conversion results of multiple paths. The path determination module 208 lets $\{P_1, P_2, P_3, \ldots, P_n\}$ represent the set of possible paths from input data node X to target data node Y in the data type conversion graph, and lets S represent a subset of these paths, $S=\{P_{i1}, P_{i2}, P_{i3}, \ldots P_{ik}\}$. For example, S may contain the k most accurate paths in the set $\{P_1, P_2, P_3, \ldots, P_n\}$. The path determination module 208 lets V be a set of m subsets of paths S, $V=\{S_1, S_2, S_3, \ldots, S_m\}$. For every $S_i$ in V, input data X is converted to target data Y through all paths in $S_i$. For every $S_i$, the path determination module 208 averages the converted values of Y generated by the paths in $S_i$. For every $S_i$, the conversion accuracy of the average is calculated by the path determination module 208 using an error function and the training data set $\{(X,Y)\}$. The path determination module 208 selects the $S_i$ in V with the highest average conversion accuracy. The averaged value of Y from the subset of paths in $S_i$ is considered to be the converted value of Y.

Further, a data hub is not necessarily required to convert to or from all other data types. In some cases, a data type of a data hub may not have a strong enough correlation with another data type, resulting in a lack of expression power for the data conversion, and/or the data conversion may lack sufficient training data to adequately act as a data hub for one or more data types. Further, a data hub may be entirely located within a single hub device (e.g., server 310) or distributed over several different devices. For example, one physical device may include many data type converters 204, but not include any encoders 202 or decoders 206.

Furthermore, in a large system including many different data types (e.g., hundreds or thousands of types of data), multiple data hubs may be utilized. For example, it may not practicable for one data type to provide suitable conversion properties to all other data types. Also, having several data hubs may reduce the total required number of data type conversions, and thus, the total amount of data type converter 204 trainings that are required for a system.

In some cases, a single data collection device 104 may not able to capture enough information for its data type to be converted to the target data type with sufficient accuracy. In such cases, the fusion module 210 may fuse information from multiple data collection devices 104 to create a single, more information-rich, data type. The resulting fused data type can then be converted to the target data type to provide improved accuracy in analysis of the target data type due to the collective information of the individual data types.

When multiple time series of different data types are synchronized, these time series may be aligned by time and fused to create a new time series that represents more information about the situation being observed. In other cases, the time series are not synchronized. For example, different data collection devices 104 may be triggered by different external events to take measurements, resulting in unsynchronized time series. In this case, the time series may be aligned, for example, by imputing missing values in order to create aligned data points.

It should be appreciated that in a manufacturing facility, failure of a key piece of equipment can cause huge financial losses and/or create a safety risk to employees. Accelerometers that detect vibration in rotating components can provide early detection of potential problems with the equipment and enable the facility operator to take preventative action of repairing or shutting down the piece of equipment before failure occurs. Vibration time series data is generally collected from accelerometers that are permanently mounted near rotating components. Frequently, a single rotating component may be monitored by multiple accelerometers. For example, a common technique involves monitoring a rotating component with three accelerometers, one each to measure vibration along the vertical (X), tangential (Y), and radial (Z) axes. Depending on its complexity and size, a single piece of machinery may have hundreds or thousands of monitored rotating components.

Vibration time series data can indicate problematic trends or anomalies, which may be detected by machine learning models. For example, machine learning analysis of gear mesh frequency in power transmission units may detect small sand or dirt particles lodged between the teeth of gears, which introduces metal particles into the gearbox. In an example embodiment, vibration time series data is used for identification of imbalance conditions in rotating equipment such as fans and/or for detection of defects in the bearings of rotating equipment. Also, for example, frequency analysis may be used to determine if rotating equipment is rotating at frequencies that approach the natural frequencies of the supporting structure. Models for a large variety of tasks have already been trained on vibration time series data, so vibration time series data is generally very useful for predictive maintenance. However, collection of vibration time series data requires a large number of permanently mounted accelerometers, which may not be practicable depending on the machinery and factory setting. Other types of data representing machine functioning may be available, but trained machine learning models for specific tasks using these data may not be available. It is not always practicable to train many machine learning models for many specific tasks using many different data types. Alternatively, machine learning models may be available for the available time series types, but the machine learning models may have poor accuracy, for example, due to insufficiency or sparseness of training data.

Figure 7:
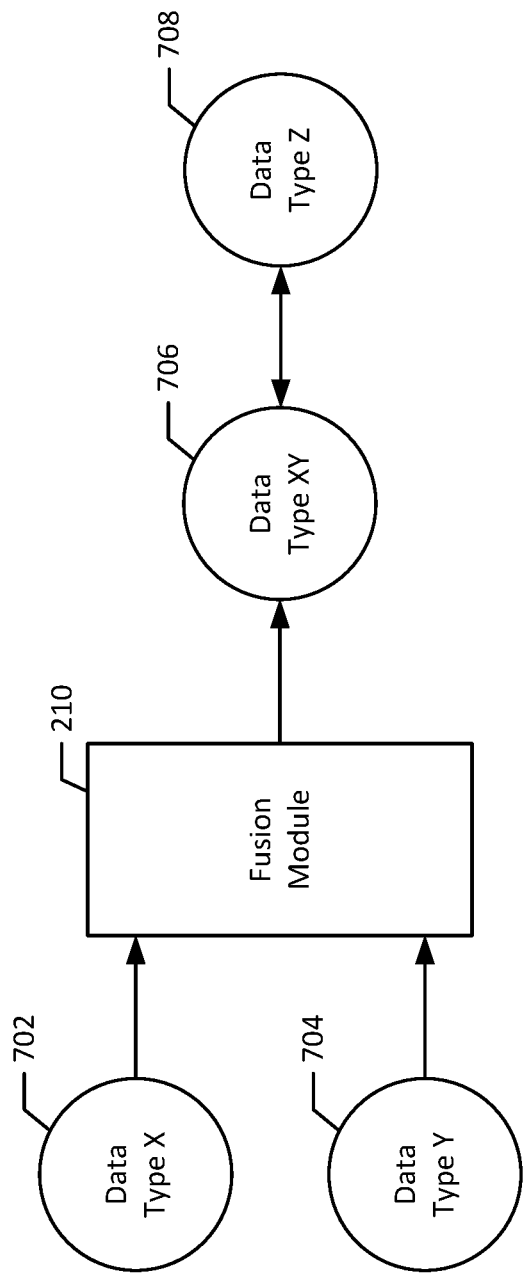
FIG. 7 is a block diagram illustrating a data type conversion graph including a data type fusion, according to an example embodiment of the present disclosure.

FIG. 7 is a block diagram illustrating a data type conversion graph 700 including a data type fusion, according to an example embodiment of the present disclosure. In an example embodiment, a machine learning model for predictive maintenance requires an input of data type Z 708. The data type X 702 and data type Y 704 are available to be collected by data collection devices 104; however, the data type X 702 alone is not rich enough to provide an accurate conversion to data type Z. Likewise, the data type Y 704 is also not rich enough to provide an accurate conversion to data type Z 708. Thus, the data type X 702 and data type Y 704 may be fused together by the fusion module 210 to create a more robust and information rich data type XY 706. The data type XY 706 may be suitable for a data type conversion to the target data type Z 708. In an example embodiment, the data type X 702 is thermal video image time series x, the data type Y 704 is ultrasonic level time series y, and the data type Z 708 is vibration time series z. For simplicity, in this example embodiment, the thermal video image time series x is represented as a 5-tuple, with a center area of the video thermal image focused on a rotating component, with four surrounding areas directly adjacent to the sides of the rotating component (e.g., above, to the right, below, and to the left). Thus, similar to the example described above, the thermal video image information at a single time step can be represented as a 5-tuple: (T, T-T1, T-T2, T-T3, T-T4)=(T, ΔT1, ΔT2, ΔT3, ΔT4). This 5-tuple represents the temperature of the rotating component (T), and the temperature differentials between the rotating component and the surrounding areas (ΔT1-ΔT4). A time series or vector x represents the temperature information for four time steps in an exemplary time series. Also, in this simplified example embodiment, ultrasound dB levels are collected only at three frequencies, α, β, and γ. At each time step, ultrasound information is represented by a 3-tuple consisting of dB levels at those three respective frequencies. The time series or vector y represents the time series of ultrasound dB level information over four time steps. Thus, at each time step, there is a corresponding 5-tuple for time series x and a corresponding 3-tuple for time series y, as illustrated below in Table 4, and simplified exemplary data is also illustrated below in Table 5.

TABLE 4

|   | $t_1$ | $t_2$ | $t_3$ | $t_4$ |
|---|---|---|---|---|
| x | $(T_1, \Delta T1_1, \Delta T2_1, \Delta T3_1, \Delta T4_1)$ | $(T_2, \Delta T1_2, \Delta T2_2, \Delta T3_2, \Delta T4_2)$ | $(T_3, \Delta T1_3, \Delta T2_3, \Delta T3_3, \Delta T4_3)$ | $(T_4, \Delta T1_4, \Delta T2_4, \Delta T3_4, \Delta T4_4)$ |
| y | $(\alpha_1, \beta_1, \gamma_1)$ | $(\alpha_2, \beta_2, \gamma_2)$ | $(\alpha_3, \beta_3, \gamma_3)$ | $(\alpha_4, \beta_4, \gamma_4)$ |

TABLE 5

|   | $t_1$ | $t_2$ | $t_3$ | $t_4$ |
|---|---|---|---|---|
| x | (30, 0, 0, 0, 0) | (30, 0.1, 0, 0, 0.1) | (30, 0.5, 0, 0.1, 0.5) | (30, 1.0, 0, 0.2, 1.0) |
| y | (10, 12, 15) | (11.3, 12.1, 16.3) | (11.82, 12.2, 16.8) | (12.6, 12.3, 17.7) |

The manner of fusing the data types together may impact how well important relationships between the two data types are captured. Thus, in an example embodiment, the time series x may be fused with the time series y by pairing each temperature differential individually with all three ultrasound frequencies, as shown below in Table 6.

TABLE 6

|   | $t_1$ | $t_2$ |
|---|---|---|
| $xy_1$ | $(T_1, \Delta T1_1, \alpha_1, \beta_1, \gamma_1),$<br>$(T_1, \Delta T2_1, \alpha_1, \beta_1, \gamma_1),$<br>$(T_1, \Delta T3_1, \alpha_1, \beta_1, \gamma_1),$<br>$(T_1, \Delta T4_1, \alpha_1, \beta_1, \gamma_1)$ | $(T_2, \Delta T1_2, \alpha_2, \beta_2, \gamma_2),$<br>$(T_2, \Delta T2_2, \alpha_2, \beta_2, \gamma_2),$<br>$(T_2, \Delta T3_2, \alpha_2, \beta_2, \gamma_2),$<br>$(T_2, \Delta T4_2, \alpha_2, \beta_2, \gamma_2)$ |

As shown above, the fused time series data $xy_1$ for each time step is represented by four 5-tuples, in which all three ultrasound dB measurements are paired with each temperature differential. In another example embodiment, the time series x may be fused with the time series y by pairing each temperature differential individually with each ultrasound frequency individually, as shown below in Table 7.

TABLE 7

|   | $t_1$ | $t_2$ |
|---|---|---|
| $xy_2$ | $(T_1, \Delta T1_1, \alpha_1),$<br>$(T_1, \Delta T1_1, \beta_1),$<br>$(T_1, \Delta T1_1, \gamma_1),$<br>$(T_1, \Delta T2_1, \alpha_1),$<br>$(T_1, \Delta T2_1, \beta_1),$<br>$(T_1, \Delta T2_1, \gamma_1),$<br>$(T_1, \Delta T3_1, \alpha_1),$<br>$(T_1, \Delta T3_1, \beta_1),$<br>$(T_1, \Delta T3_1, \gamma_1),$<br>$(T_1, \Delta T4_1, \alpha_1),$<br>$(T_1, \Delta T4_1, \beta_1),$<br>$(T_1, \Delta T4_1, \gamma_1)$ | $(T_2, \Delta T1_2, \alpha_2),$<br>$(T_2, \Delta T1_2, \beta_2),$<br>$(T_2, \Delta T1_2, \gamma_2),$<br>$(T_2, \Delta T2_2, \alpha_2),$<br>$(T_2, \Delta T2_2, \beta_2),$<br>$(T_2, \Delta T2_2, \gamma_2),$<br>$(T_2, \Delta T3_2, \alpha_2),$<br>$(T_2, \Delta T3_2, \beta_2),$<br>$(T_2, \Delta T3_2, \gamma_2),$<br>$(T_2, \Delta T4_2, \alpha_2),$<br>$(T_2, \Delta T4_2, \beta_2),$<br>$(T_2, \Delta T4_2, \gamma_2)$ |

As shown above, the fused time series data $xy_2$ for each time step is represented by twelve 3-tuples, in which each individual ultrasound dB measurement is paired with each individual temperature differential. The fused time series data $xy_2$ may be more able to capture individual relationships than the fused time series data $xy_1$ depending on how the temperature temporal variations in specific regions interplay with the temporal variations in the specific ultrasound frequencies. For example, if each of the temperature differentials in the different areas have different temporal correlations vis-a-vis each of the three ultrasound frequencies, fused time series data $xy_2$ may provide a richer distributed representation than fused time series data $xy_1$. The fusion module 210 may more efficiently be able to create fused time series data as shown in Table 6. In a typical example, rather than a 5-tuple and 3-tuple as shown above in the simplified example, there may be dozens or hundreds of temperature differentials and ultrasound frequencies, and/or other variables, which may result in a combinatorial explosion. On the other hand, if each of the temperature differentials in the different areas have very similar temporal correlations vis-a-vis all three of the ultrasound frequencies, then the fusion technique shown in Table 7 may be unnecessary, significantly increasing the required computation to fuse the data without significantly increasing accuracy available through the fused data type. Thus, the fusion module 210 may weigh the benefits of performance and computational load of different possible fusion techniques to determine which specific type of fusion to perform. Typically, a plurality of options for fusing data may exist, the fusion module 210 may determine which option should be used.

Based on the above exemplary data in Table 5, the fused time series data $xy_2$ is shown as below in Table 8.

TABLE 8

|   | $t_1$ | $t_2$ | $t_3$ | $t_4$ |
|---|---|---|---|---|
| $xy_2$ | (30, 0, 10), | (30, 0.1, 11.3), | (30, 0.5, 11.82), | (30, 1.0, 12.6), |
|   | (30, 0, 12), | (30, 0.1, 12.1), | (30, 0.5, 12.2), | (30, 1.0, 12.3), |
|   | (30, 0, 15), | (30, 0.1, 16.3), | (30, 0.5, 16.8), | (30, 1.0, 17.7), |
|   | (30, 0, 10), | (30, 0, 11.3), | (30, 0, 11.82), | (30, 0, 12.6), |
|   | (30, 0, 12), | (30, 0, 12.1), | (30, 0, 12.2), | (30, 0, 12.3), |
|   | (30, 0, 15), | (30, 0, 16.3), | (30, 0, 16.8), | (30, 0, 17.7), |
|   | (30, 0, 10), | (30, 0, 11.3), | (30, 0.1, 11.82), | (30, 0.2, 12.6), |
|   | (30, 0, 12), | (30, 0, 12.1), | (30, 0.1, 12.2), | (30, 0.2, 12.3), |
|   | (30, 0, 15), | (30, 0, 16.3), | (30, 0.1, 16.8), | (30, 0.2, 17.7), |
|   | (30, 0, 10), | (30, 0.1, 11.3), | (30, 0.5, 11.82), | (30, 1.0, 12.6), |
|   | (30, 0, 12), | (30, 0.1, 12.1), | (30, 0.5, 12.2), | (30, 1.0, 12.3), |
|   | (30, 0, 15) | (30, 0.1, 16.3) | (30, 0.5, 16.8) | (30, 1.0, 17.7) |

As shown in FIG. 7, the fusion module 210 outputs data type XY 706. For example, the fused time series xy may be encoded as a distributed representation, DR(xy), which may then be converted into a target data type Z, as DR(z), which may then be decoded as a time series z for use in the machine learning model that uses time series z as its input.

In an example embodiment, the vibration time series z includes four different rotating components (V1-V4), each with accelerometer time series data being collected to measure vibration in three axes. Thus, at each time step, there is a corresponding 3-tuple for each rotating component in time series z, as illustrated below in Table 9, and simplified exemplary data is also illustrated below in Table 10.

TABLE 9

|   |   | $t_1$ | $t_2$ | $t_3$ | $t_4$ |
|---|---|---|---|---|---|
| z | V1 | $(V1X_1, V1Y_1, V1Z_1),$ | $(V1X_2, V1Y_2, V1Z_2),$ | $(V1X_3, V1Y_3, V1Z_3),$ | $(V1X_4, V1Y_4, V1Z_4),$ |
|   | V2 | $(V2X_1, V2Y_1, V2Z_1),$ | $(V2X_2, V2Y_2, V2Z_2),$ | $(V2X_3, V2Y_3, V2Z_3),$ | $(V2X_4, V2Y_4, V2Z_4),$ |
|   | V3 | $(V3X_1, V3Y_1, V3Z_1),$ | $(V3X_2, V3Y_2, V3Z_2),$ | $(V3X_3, V3Y_3, V3Z_3),$ | $(V3X_4, V3Y_4, V3Z_4),$ |
|   | V4 | $(V4X_1, V4Y_1, V4Z_1)$ | $(V4X_2, V4Y_2, V4Z_2),$ | $(V4X_3, V4Y_3, V4Z_3),$ | $(V4X_4, V4Y_4, V4Z_4),$ |

TABLE 10

| | | $t_1$ | $t_2$ | $t_3$ | $t_4$ |
|---|---|---|---|---|---|
| z | V1 | (3.2, 5.0, 0.0), | (3.0, 5.0, 0.4), | (1.8, 5.0, 2.1), | (0, 5.0, 4.2), |
| | V2 | (6.0, 6.0, 6.0), | (6.0, 6.0, 6.0), | (6.0, 6.0, 6.0), | (6.0, 6.0, 6.0), |
| | V3 | (5.0, 5.0, 5.0), | (5.0, 5.0, 5.0), | (5.0, 5.0, 5.0), | (5.0, 5.0, 5.0), |
| | V4 | (4.0, 4.0, 4.0) | (4.0, 4.0, 4.1) | (4.0, 4.0, 4.6) | (4.0, 4.0, 5.6) |

As illustrated above, while V2 and V3 are unchanged through the four time steps, V1 undergoes a rotation of the axis of vibration from the X-Y plane to the Y-Z plane, as the X-coordinate begins at 3.2 and decreases to 0, while the Z-coordinate begins at 0 and increases to 4.2. The value of V1X decreases in the time series z because of the underlying relationship between V1X to $\Delta T1$ and $\alpha$. On the other hand, the value of V1Z increases in the time series z because of the underlying relationship between V1Z to $\Delta T4$ and $\gamma$. Also, V4 shows an increase in vibration only in the direction of the Z-axis based on the underlying relationship between V4Z and $\Delta T1$. The underlying relationships may include time dependencies and/or cross-domain dependencies that may not be readily apparent. The fused time series xy may be converted to DR(xy) which captures the cross-domain relationships, such as the relationships between $\Delta T1$ and a, between $\Delta T4$ and $\gamma$, and temporal relationships, such as between V4Z and $\Delta T1$. Thus, fusing this data together as data type XY, allows for encoding the time series xy as DR(xy), which includes information that would not be represented in either of DR(x) or DR(y) generated by the unfused data. Thus, DR(xy) may provide more accurate machine learning results than can be accomplished with either of data type X or data type Y individually, or even with data types X and Y in combination as inputs to a machine learning model. It should be appreciated that in a typical embodiment, the underlying relationships are far more complex than those described in regard to the above simplified example. Moreover, fusing data types as described above may allow for improved extraction of information from available data, which may result in improved predictive maintenance, less equipment downtime, lower repair costs, improved safety, and the like.

Further, although the above example embodiments only include two data types being fused together, more than two data types may be fused in the same manner as described above to create a complex data fusion. For example, data type C 606, data type E 610, and data type F 612 may be fused to create a data type G. Also, an already fused data type (e.g., data type XY 706) may be fused with another non-fused data type (e.g., data type U) or another already fused data type (e.g., data type UVW).

Previously existing machine learning methods (e.g., for industrial predictive maintenance) were generally useful for handling some specific types of time series data, for example, in a homogeneous environment or within a specific edge device 100. However, we recognize that the variability of available data types and sources that may be collected for analysis, particularly in heterogeneous environments such as the IoT, cannot be adequately handled using the existing methods. For example, it is not practicable to train accurate machine learning models for each specific type of data and/or for each specific source of data. Attempting to address this problem with better and faster computer and/or networking hardware proves inadequate, as even the most technologically advanced computer hardware, software, and networking capabilities are not suitable for handling the ever expanding data domains, types of data, and specific data sources of heterogeneous environments which are typically encountered. In other words, the existing techniques are generally insufficient for handling machine learning in a heterogeneous environment with a wide variety of different data types and sources that provide time series data. On the other hand, collection of time series data for machine learning or the like as proposed herein takes a different technological approach that was not possible using previously existing methods and systems. Accordingly, machine learning devices, particularly when using edge devices 100 in heterogeneous environments such as the IoT, are improved by using the methods and systems as described herein. For example, the technology of fault detection and predictive maintenance in relation to steam traps and manufacturing equipment may be greatly improved by the present disclosure.

It will be appreciated that all of the disclosed methods and procedures described herein can be implemented using one or more computer programs, modules, or components. These modules or components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. As used in the following claims, the terms "means" and/or "step" may be used to invoke means plus function treatment under 35 U.S.C. 112(f), and means plus function treatment is not intended to be invoked unless the terms "means" or "step" are recited in the claims.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A data conversion device comprising:
   at least one memory; and
   at least one processor configured to:
      obtain first data;
      encode, by using an encoder, the first data to a first distributed representation;
      generate, by using a converter trained using a neural network and after the encoding of the first data, a second distributed representation using the first distributed representation; and
      decode, by using a decoder and after the generation of the second distributed distribution, the second distributed representation to second data; and
      output the second data as data generated from the first data, wherein
   the first data is image data and the second data is non-image data.

2. The data conversion device according to claim 1, wherein
the encoder includes an input layer to which the first data is inputted, at least one middle layer, and an output layer outputting the first distributed representation; and
the decoder includes an input layer to which the second distributed representation is inputted, at least one middle layer, and an output layer outputting the second data.

3. The data conversion device according to claim 1, wherein
the converter is trained by using the first distributed representation for training and the second distributed representation for training.

4. The data conversion device according to claim 1, wherein
the encoder is trained by using an autoencoder.

5. The data conversion device according to claim 1, wherein the at least one processor is further configured to:
generate, by using a second converter, a third distributed representation using the first distributed representation; and
generate, by using a third converter, the second distributed representation using the third distributed representation.

6. The data conversion device according to claim 1, wherein the first data and the second data are of types of data collected by respective data collectors.

7. A data conversion method comprising:
obtaining, by at least one processor, first data;
encoding, by the at least one processor using an encoder, the first data to a first distributed representation;
generating, by the at least one processor using a converter trained using a neural network and after the encoding of the first data, a second distributed representation using the first distributed representation;
decoding, by the at least one processor using a decoder and after the generation of the second distributed distribution, the second distributed representation to second data; and
outputting the second data as data generated from the first data, wherein
the first data is image data and the second data is non-image data.

8. The data conversion method according to claim 7, wherein
the encoder includes an input layer to which the first data is inputted, at least one middle layer, and an output layer outputting the first distributed representation; and
the decoder includes an input layer to which the second distributed representation is inputted, at least one middle layer, and an output layer outputting the second data.

9. The data conversion method according to claim 7, wherein
the converter is trained by using the first distributed representation for training and the second distributed representation for training.

10. The data conversion method according to claim 7, wherein
the encoder is trained by using an autoencoder.

11. The data conversion method according to claim 7 further comprising:
generating, by the at least one processor using a second converter, a third distributed representation using the first distributed representation; and
generating, by the at least one processor using a third converter, the second distributed representation using the third distributed representation.

12. The data conversion method according to claim 7, wherein the first data and the second data are of types of data collected by respective data collectors.

13. A non-transitory computer readable medium storing a program which, when executed by at least one processor, performs a method comprising:
obtaining first data;
encoding, by using an encoder, the first data to a first distributed representation;
generating, by using a converter trained using a neural network and after the encoding of the first data, a second distributed representation using the first distributed representation; and
decoding, by using a decoder and after the generation of the second distributed distribution, the second distributed representation to second data; and
outputting the second data as data generated from the first data, wherein
the first data is image data and the second data is non-image data.

14. The non-transitory computer readable medium according to claim 13, wherein
the encoder includes an input layer to which the first data is inputted, at least one middle layer, and an output layer outputting the first distributed representation; and
the decoder includes an input layer to which the second distributed representation is inputted, at least one middle layer, and an output layer outputting the second data.

15. The non-transitory computer readable medium according to claim 13, wherein
the encoder is trained by using an autoencoder.

16. The non-transitory computer readable medium according to claim 13, wherein the method further comprises:
generating, by using a second converter, a third distributed representation using the first distributed representation; and
generating, by using a third converter, the second distributed representation using the third distributed representation.

17. The data conversion device according to claim 1, wherein the decoder is trained by using an autoencoder.

18. The data conversion method according to claim 7, wherein the decoder is trained by using an autoencoder.

19. The data conversion device according to claim 1, wherein a dimensionality of the first distributed representation is lower than a dimensionality of the first data.

20. The data conversion method according to claim 7, wherein a dimensionality of the first distributed representation is lower than a dimensionality of the first data.

21. The non-transitory computer readable medium according to claim 13, wherein a dimensionality of the first distributed representation is lower than a dimensionality of the first data.

22. The data conversion device according to claim 1, wherein
the at least one processor is configured to:
generate, by fusing the first data and third data, the first distributed representation, wherein the third data is a different type of data than the first data, and
output the second data as data generated from the first data and the third data.

23. The data conversion method according to claim 7, wherein
- the encoding includes generating the first distributed representation by fusing the first data and third data,
- the third data is a different type of data than the first data, and
- the second data is outputted as data generated from the first data and the third data.

24. The non-transitory computer readable medium according to claim 13, wherein
- the encoding includes generating the first distributed representation by fusing the first data and third data,
- the third data is a different type of data than the first data, and
- the second data is outputted as data generated from the first data and the third data.

25. The data conversion device according to claim 1, wherein
- the first data is time-series data, and
- the first distributed representation represents time dependencies of the time-series data.

26. The data conversion method according to claim 7, wherein
- the first data is time-series data, and
- the first distributed representation represents time dependencies of the time-series data.

27. The non-transitory computer readable medium according to claim 13, wherein,
- the first data is time-series data, and
- the first distributed representation represents time dependencies of the time-series data.

* * * * *

UNITED STATES PATENT AND TRADEMARK OFFICE
CERTIFICATE OF CORRECTION

| | | |
|---|---|---|
| PATENT NO. | : 12,106,232 B2 | Page 1 of 1 |
| APPLICATION NO. | : 16/579552 | |
| DATED | : October 1, 2024 | |
| INVENTOR(S) | : Daisuke Okanohara and Justin Clayton | |

It is certified that error appears in the above-identified patent and that said Letters Patent is hereby corrected as shown below:

On the Title Page

ITEM "(73) ASSIGNEE":
"(73) Assignee: Preferred Networks, Inc., Tokyo (JP)"
Should read:
-- (73) Assignee: Preferred Elements, Inc., Tokyo-to (JP) --.

Signed and Sealed this
Fifth Day of August, 2025

Coke Morgan Stewart
*Acting Director of the United States Patent and Trademark Office*